(12) United States Patent
Patel et al.

(10) Patent No.: US 10,909,567 B1
(45) Date of Patent: Feb. 2, 2021

(54) SYSTEMS AND METHODS TO MANAGE FEEDBACK FOR A MULTI-ARM BANDIT ALGORITHM

(71) Applicant: Capital One Services, LLC, McLean, VA (US)

(72) Inventors: Gunjan Patel, Frisco, TX (US); Anil Konduru, Plano, TX (US); Kirankumar Kulkarni, McKinney, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/702,697

(22) Filed: Dec. 4, 2019

(51) Int. Cl.
  *G06Q 30/02*  (2012.01)
  *G06K 9/62*  (2006.01)
  *G06N 20/00*  (2019.01)

(52) U.S. Cl.
  CPC ....... *G06Q 30/0244* (2013.01); *G06K 9/6264* (2013.01); *G06N 20/00* (2019.01); *G06Q 30/0243* (2013.01); *G06Q 30/0272* (2013.01)

(58) Field of Classification Search
  USPC ...................................... 370/252; 705/14.44
  See application file for complete search history.

(56) References Cited

U.S. PATENT DOCUMENTS

| | | | | |
|---|---|---|---|---|
| 2010/0097948 | A1* | 4/2010 | Barberis | H04B 17/345 370/252 |
| 2014/0074591 | A1* | 3/2014 | Allen | G06Q 30/0244 705/14.43 |
| 2014/0114746 | A1* | 4/2014 | Pani | G06Q 10/067 705/14.45 |
| 2015/0332313 | A1* | 11/2015 | Slotwiner | G06Q 30/0241 705/14.44 |

* cited by examiner

*Primary Examiner* — Saba Dagnew
(74) *Attorney, Agent, or Firm* — Hunton Andrews Kurth LLP (57) ABSTRACT

Systems and methods for managing feedback for a multi-ARM bandit algorithm are disclosed. For example, the system may include one or more memory units storing instructions and one or more processors configured to execute the instructions to perform operations. The operations may include sending, to a device, a creative configured for display on the device. The operations may include receiving, from the device, feedback data associated with the creative, wherein the feedback data indicates a degree of user interaction with the creative. The operations may include checking the feedback data for a baked time associated with the creative. The operations may include sending the feedback data to a node based on the baked time. The operations may include updating, by the node, a model associated with the feedback data.

15 Claims, 5 Drawing Sheets

SYSTEMS AND METHODS TO MANAGE FEEDBACK FOR A MULTI-ARM BANDIT ALGORITHM

CROSS-REFERENCE TO RELATED APPLICATIONS

This application relates to U.S. patent application Ser. No. 16/391,299, filed Apr. 23, 2019, titled "Systems and Methods for Self-Serve Marketing Pages with Multi-Armed Bandit," the disclosure of which is expressly incorporated herein by reference in its entirety.

TECHNICAL FIELD

The disclosed embodiments generally relate to systems and methods for managing feedback for a multi-arm bandit algorithm. In particular, and without limitation, the disclosed embodiments relate to systems and methods for configuring creatives based on feedback data processed at a cluster architecture.

BACKGROUND

Selecting and configuring advertisements and other creatives to display on webpages is necessary for users to maximize their revenue, viewership, and other desirable interactions. Historically, advertisers have relied on visitor demographics, previous purchase history, product selection, and other criteria to inform their advertising decisions. As an example, in some situations particular products may be selected by users and recommended to visitors in advertising banners placed at a top or side location in a webpage in order to convince a prospective customer to purchase a product for sale on the webpage. The objective may be to maximize total sales revenue.

In other situations, advertisements and other creatives may be configured by users with a different objective. For example, users may select web advertisements and alter the layout of their webpages in order to increase the number of visits to their website. These objectives and others need not be mutually exclusive. To maximize sales revenue and to increase a number of webpage visits, users may also evaluate multiple versions of proposed webpages and advertisements as part of a testing or production phase to determine a singular or most profitable online digital experience.

Traditionally, Adobe® A/B testing has provided a comparison between two versions (A and B) of a digital experience (e.g., via a webpage) to determine which experience attracts more user interaction. Testing may be conducted in accordance with a number of clicks, sales, or other criteria to determine which version or variant achieves a better performance. Typically, Adobe® A/B testing includes placing a test web page in a production phase for a testing period, waiting for the testing to complete and the results of the testing to be collected, analyzing the testing results to determine web pages providing a winning experience or set of experiences, and then manually adjusting the flow of online or web traffic so that the winning webpages may be displayed to users.

However, Adobe® A/B testing suffers from numerous drawbacks. For example, a lengthy wait for results to be tabulated in A/B testing may cause users a significant delay in making adjustments. Moreover, existing adjustment processes are manual in scope, leading to inefficiencies and inaccurate variants being displayed to potential customers. Additionally, display of suboptimal webpages may hinder the advertising of users aiming to improve their revenue stream, number of website visits, or some other metric. More importantly, while Adobe® A/B displays results of webpage testing to a user, it lacks a means for automatically and dynamically responding to real-time viewer interactions.

Typically, feedback systems for creatives continually poll for feedback, even when it is unlikely a creative has experienced sufficient user interaction. This approach suffers from a number of technical and computational drawbacks. For one, such an approach inefficiently allocates feedback system resources by attempting to collect and process feedback too early. Polling for feedback too early (e.g., before a sufficient interaction level occurs) also results in inaccurate and/or redundant data sets, further squandering system resources. Moreover, processing units within conventional feedback systems store data (e.g., a delay time) in an external database or other persistent system, which can increase latency and strain system resources, such as storage devices and network interfaces.

Therefore, systems and methods are needed to assist users with configuring creatives. In particular, systems and methods are needed for gathering and processing feedback data at appropriate times so as to efficiently use system resources. Moreover, automated processes are needed that allow for automatic processing of feedback data related to creatives, to dynamically update models of creatives, which significantly shortens the time required to test out multiple creatives. Further, maintaining models, rather than storing images or files of creatives themselves, can reduce burdens on storage devices and allow for real-time automatic updating of creatives displayed on remote devices. Finally, there is a need for scalable in-memory clustered environments to quickly process feedback data and adapt creatives.

The disclosed feedback system and methods using a cluster architecture to configure creatives may address one or more of the problems set forth above and/or other problems in the prior art.

SUMMARY

The disclosed embodiments provide unconventional methods and systems for managing creatives and feedback data associated with creatives. The disclosed systems and methods may be implemented using a combination of conventional hardware and software as well as specialized hardware and software, such as a machine constructed and/or programmed specifically for performing functions associated with the disclosed method steps.

Consistent with the present embodiments, there is provided a system for managing creatives and feedback data associated with creatives. The system may include one or more memory units storing instructions and one or more processors configured to execute the instructions to perform operations. The operations may include sending, to a device, a creative configured for display on the device. The operations may include receiving, from the device, feedback data associated with the creative, wherein the feedback data indicates a degree of user interaction with the creative. The operations may include checking the feedback data for a baked time associated with the creative. The operations may include sending the feedback data to a node based on the baked time. The operations may include updating, by the node, a model associated with the feedback data.

Consistent with the present embodiments, a method for managing creatives and feedback data associated with creatives is disclosed. The method may include receiving feedback data associated with a creative from a device, wherein the feedback data indicates a degree of user interaction with the creative. The method may include placing the feedback data into a distributed delay queue. The method may include determining the feedback data has a baked time associated with the creative. The method may include sending the feedback data to a cluster based on the baked time, the cluster having a plurality of nodes. The method may include determining an available node of the plurality of nodes. The method may include sending the feedback data to the available node. The method may include updating, by the node, a model associated with the feedback data.

Consistent with other disclosed embodiments, non-transitory computer readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

The disclosure is generally directed to automated systems and processes for coordinating the processing of feedback data related to a multi-armed bandit engine to efficiently configure models (e.g., machine learning models) associated with creatives. In some embodiments, feedback data is collected, given an in-memory delay time, and placed into a queue (e.g., a distributed delay queue). In some embodiments, when the in-memory delay elapses, a node may process the feedback data and update a corresponding model. In other embodiments, a user interface, graphic, text, webpage, or other data may be reconfigured based on the processed feedback data and/or the updated model.

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1:
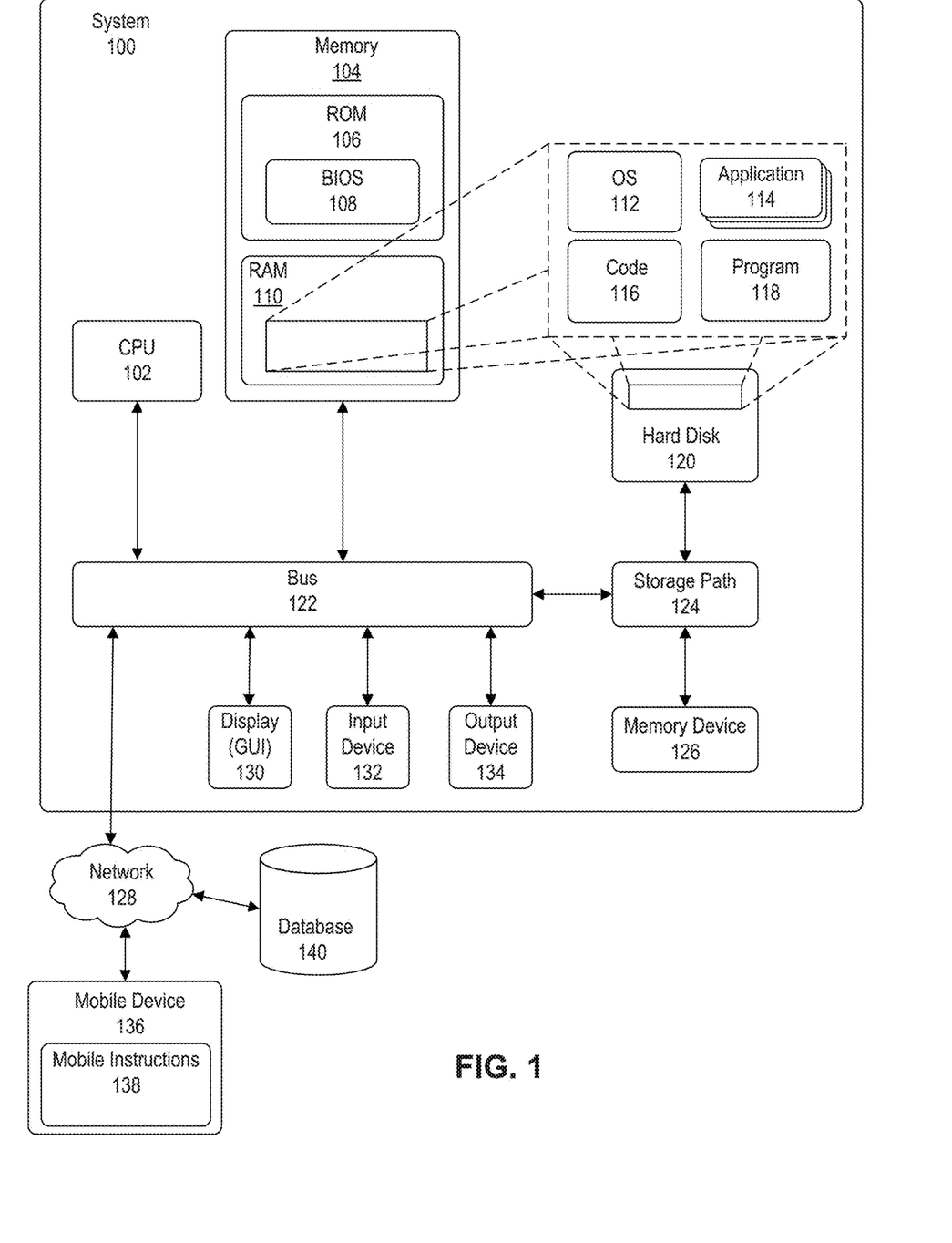
FIG. 1 is a diagram of an exemplary system consistent with the disclosed embodiments.

FIG. 1 is a block diagram of system 100 consistent with disclosed embodiments. In some aspects, system 100 may reflect a computing system for receiving, transmitting, and processing data. Components of system 100 may include a central processing unit (CPU) or processor 102, a memory unit 104, and a bus 122 that interconnects system components including memory 104 and CPU 102. Bus 122 may be any of several types of bus structures including a memory bus or memory controller, a peripheral bus, and a local bus using any of a variety of bus architectures. By way of example, and without limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

System 100 may include a variety of computer-readable media. Computer-readable media can be any available media that can be accessed by system 100 and includes both volatile and nonvolatile media. For example, computer-readable media may include volatile and nonvolatile computer storage media implemented in any method or technology for storage of information such as computer-readable instructions data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by system 100.

Memory 104 may include computer-readable media in the form of volatile and/or nonvolatile memory such as read only memory (ROM) 106 and random access memory (RAM) 110. A basic input/output system (BIOS) 108, containing the basic routines that help to transfer information between elements within system 100, is typically stored in ROM 106. Additionally, RAM 110 may contain operating system (OS) 112, applications 114, other programmable code 116, and program 118. RAM 110 may contain data and/or program modules that are immediately accessible to and/or presently being operated on by CPU 102, including a delay time associated with data, such as feedback data. In addition to RAM 110, hard disk 120 and/or memory device 126 may also contain data and/or program modules to carry out the embodiments described herein.

System 100 may also include other removable/nonremovable, volatile/nonvolatile computer media. By way of example, FIG. 1 illustrates a hard disk 120 that reads from or writes to nonremovable, nonvolatile magnetic media, and a memory device 126 that may be an optical disk drive or a magnetic disk drive that reads from or writes to a removable, a nonvolatile storage medium such as an optical disk or magnetic disk. Other removable/nonremovable, volatile/nonvolatile computer storage media that can be used in exemplary system 100 include, but are not limited to, magnetic tape cassettes, flash memory cards, digital versatile disks, digital video tape, solid state RAM, and solid state ROM. Hard disk drive 120 and memory device 126 may be connected to bus 122 through a storage path 124.

The disks and their associated computer media, discussed above and illustrated in FIG. 1, provide storage of computer-readable instructions, programmable code, data structures, program modules and other data for system 100. In FIG. 1, hard disk 120 is illustrated as storing an operating system (OS) 112, one or more applications 114, other programmable code 116, and a program 118. A user may enter commands and information into system 100 through an input device 132 such as a keyboard, mouse, trackball, touch pad tablet, touchscreen display, electronic digitizer, or microphone.

Other input devices may include a joystick, game pad, satellite dish, and scanner. These and other input devices are connected to CPU 102 through an input interface that is coupled to bus 122, but may be connected by other interface and bus structures, such as a parallel port, game port or a universal serial bus (USB). A display (GUI) 130 or other type of video device may also be connected to bus 122 via an interface, such as a video interface. Display 130 may comprise any suitable display for presenting user interfaces, windows, graphical content, text content, and/or information consistent with the disclosed embodiments. In some embodiments, for example, such as a CRT display, LCD display, LED display, touchscreen display (e.g., using any suitable sensing technology such as resistive, capacitive, infrared, etc.), projected display, and so forth. In addition, an output device 134, such as speakers or a printer, may be connected to bus 122 through an output interface.

System 100 may operate in a networked environment using a network 128 a mobile device 136, and a database 140. Multiple instances (not shown) of system 100 may exist, such that a system 100 may connect to other systems 100 using network 128. System 100 may also include a personal computer (e.g., a laptop, desktop, etc.), a server, a router, a network PC, a peer device, a mobile device (e.g., such as mobile device 136), or other common network node. Mobile device 136 may include a tablet, smartphone, or PDA, etc. In some aspects, mobile device 136 may comprise any or ail of the components of system 100. Database 140 may store data for use by mobile device 136 or system 100.

Network 128 depicted in FIG. 1 may include a wired or wireless local area network (LAN), a wide area network (WAN), cellular network (e.g., a CDMA or GSM network), RF network, Near Field Communication (NFC) network, WiFi network, Metropolitan Area Network (MAN), NFC communication link(s), any physical wired connection (e.g., via an I/O port), a Personal Area Network (PAN) (e.g., a Bluetooth™ network), or other type of network. Consistent with the disclosed embodiments, network 128 may include any accessible network or networks interconnected via one or more communication protocols, including hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, network 128 may also include one or more mobile device networks, such as a GSM network or a PCS network, allowing system 100 and/or mobile device 136 to send and receive data via applicable communications protocols. Such networking environments are commonplace in offices, enterprise-wide computer networks, intranets, and the Internet. In a networked environment, programmable code and application programs may be stored in remote computers. By way of example, FIG. 1 illustrates mobile instructions 138 as residing on mobile device 136. It will be appreciated that the network connections shown are exemplary and other means of establishing communication between computers and mobile device 136 may be used.

In some embodiments, aspects of system 100 may be implemented on one or more cloud services designed to generate ("spin-up") one or more ephemeral container instances in response to event triggers, assign one or more tasks to a container instance, and terminate ("spin-down") a container instance upon completion of a task. By implementing methods using cloud services, disclosed systems efficiently provision resources based on demand and provide security advantages because the ephemeral container instances may be closed and destroyed upon completion of a task. That is, the container instances do not permit access from outside using terminals or remote shell tools like SSH, RTP, FTP, or CURL, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of client devices, interfaces, model optimizers, model storages, and databases. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

Figure 2:
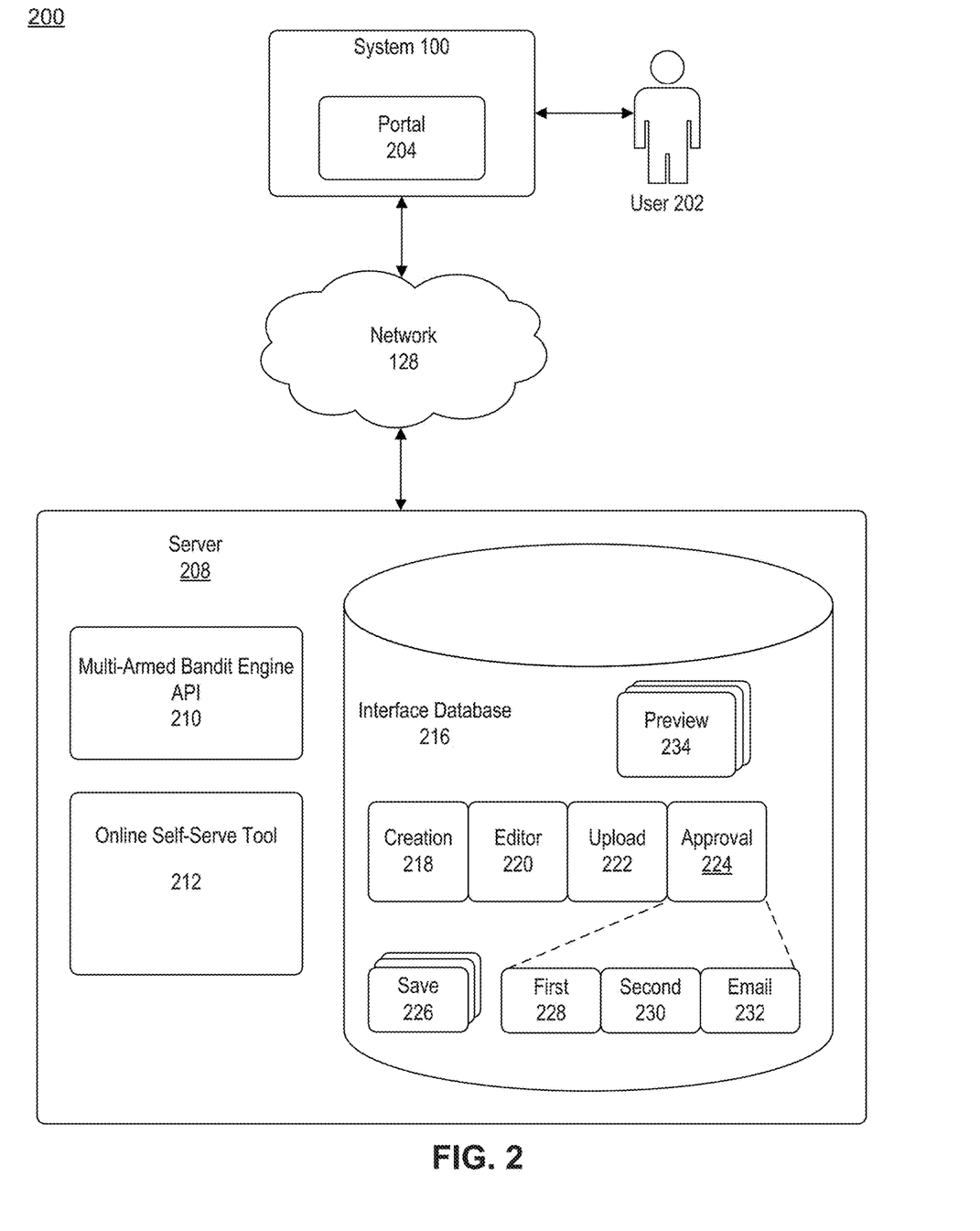
FIG. 2 is a diagram of an exemplary architecture of system components consistent with the disclosed embodiments.

Referring now to FIG. 2, there is shown a block diagram representing an exemplary architecture 200 of system components consistent with disclosed embodiments. In some aspects, architecture 200 may comprise any component of the environment described in connection with FIG. 1 (e.g., system 100) in addition to those discussed below. In various embodiments, for instance, system 100 (e.g., a computer) or mobile device 136, operated by user 202, may be operably coupled to one or more servers 208 (e.g., a second system 100) via network 128 in architecture 200. As described above, network 128 may be any type of network such as a local area network (LAN), a wide area network (WAN), or other type of network.

A portal 204 may execute on system 100 and/or mobile device 136 (e.g., via an appropriate application 114 and/or program 118). In some embodiments, portal 204 may be a web browser, an email service, a program, an application, or other suitable interactive for user interaction. Portal 204 may include functionality for receiving data entered by user 202 (e.g., via an appropriate input device 132) as part of a self-serve tool consisting of a plurality of graphical user interfaces (GUIs), such as those displayed on display 130. In general, Portal 204 may be any type of interpreted or executable software code such as a kernel component, an application program (e.g., Firefox, Google Chrome, Internet Explorer, etc.), a script, a linked library, an object with methods, and so forth.

Server 208 may be any type of computer system or computing device, such as computer system 100 of FIG. 1, for conducting processes consistent with the disclosed embodiments. Server 208 may be a special-purpose computer, an instance of computer 100, a computing cluster, a database, or other device capable of operating multi-armed bandit engine API 210, which may analyze creatives and determine a winning creative (e.g., determining which creatives are most effective at enticing user interaction and identifying various characteristics about them and their distribution process to do so). In general, server 208 may provide services for operating with a multi-armed bandit engine API 210 and an online self-serve tool 212. In some embodiments, a creative may be a webpage, a file, an email, an audiovisual work, a link, a GUI, information to be printed on direct mail; or other data consistent with the disclosed embodiments. Server 208 may also communicate with online self-serve tool 212, which may interact with multi-armed bandit engine API 210 and data associated with creatives observed and/or managed by multi-armed bandit engine API 210.

An application program interface (API) may be a set of subroutine definitions, communication protocols, and/or programming tools that build software. In particular, multi-armed bandit engine API 210 may be an API that determines how to allocate a finite amount of resources, such as computational resources, based on learning from observations over time. Multi-armed bandit engine API 210 may include an objective (e.g. delivering a "winning" webpage, etc.). Multi-armed bandit engine API 210 may include predetermined rules or may dynamically develop rules. Once those rules are specified and finalized, reinforcement learning algorithms may play a "game" multiple times to find a best strategy to "win" or deliver a "winning" creative (e.g. a webpage that draws the most user attention and/or interaction). In collaboration with online self-serve tool 212, multi-armed bandit engine API 210 may select creatives, such as advertisements or webpages (e.g., a website landing page), that may result in a desired user interaction or engagement with a website and/or may maximize the total revenue from user clicks or based on other criteria.

Online self-serve tool 212 may be any or all of a webpage, program, GUI, application, or other software implementation that a user may access using portal 204. In some embodiments, online self-serve tool 212 may process and display data (e.g. at display 130) in response to user interactions (e.g. inputs to portal 204 through, e.g., input device 132).

Interface database 216 may include one or more graphical interfaces for displaying and receiving information consistent with the disclosed embodiments. As depicted in FIG. 2, for instance, interface database 216 may store a creation interface 218, an editor interface 220, an upload interface 222, and a plurality of approval interfaces 224. User 202 may utilize one or more of the interfaces (e.g., in connection with system 100) to customize a creative. Server 208 may send any or all of these interfaces from interface database 216 to a display (e.g. at display 130) based on user input (e.g. inputs to portal 204 through, e.g., input device 132). In some embodiments, creation interface 218 is sent to system 100 based on an input from user 202 to portal 204 indicating that the user would like to create a new creative (e.g. by selecting a button labeled "create"). Creation interface 218 may provide user 202 with selectable options or parameters for configuring editor interface 220. For example, creation interface 218 may include a fillable field labeled "creative type," which may allow user 202 to select a type of creative (e.g. by using a drop-down menu to select among "email," "webpage advertisement," "webpage," etc.).

Based on the input received from user 202 at creation interface 218, server 208 may configure editor interface 220 to have particular customizable fields, parameters, graphics, links, animations, text, and other customizable features that user 202 may manipulate to create a custom creative (e.g., editor interface 218 may provide user 202 with manipulable animations if user 202 indicated at creation interface 218 an intent to create a webpage). After receiving input from user 202 to creation interface 218, server 208 may configure and send editor interface 218 for display. Upload interface 222 may display a finalized creative to user 202 with a selectable option (e.g., button), which a user can select to upload a creative to server 208, system 100, database 140, or other storage.

Approval interfaces 224 may include a first approval interface 228, a second approval interface 230, and an email interface 232. Server 208 may transmit first and second interfaces 228, 230 of approval interfaces 224 for approval and publication of web content. Server 208 may also transmit email interface 232 as an approval interface 224. Approval interfaces 224 may allow for a user to approve content before publishing of the content on a webpage. Any or all of these interfaces may provide user 202 with buttons, password fields, or other interactive elements that user 202 may use to indicate approval. Based on input from user 202 to any or all of the approval interfaces 224, server 208 may send out a creative (e.g. to a website, individual email accounts, etc.).

In some embodiments, online self-serve tool 212 may communicate with interface database 216 to provide a series of GUI interfaces for user 202. For example, server 208 may transmit first and second interfaces 228, 230 of approval interfaces 224 for approval and publication of web content. Server 208 may also transmit email interface 232 as an approval interface 224. Approval interfaces 224 may allow for a user to approve content before publishing the content on a webpage or other medium. In other embodiments, content may be changed automatically and a notification interface (not shown) may be displayed to inform a user of the change and/or display performance metrics or other information associated with a particular creative.

Interface database 216 may also include multiple save interfaces 226 and multiple preview interfaces 234. These interfaces may allow user 202 to preview different aspects of an unpublished creative (e.g. as it would appear if it were published) and save it to a device, such as server 208, system 100, or database 140. Other interfaces (not shown) may be contemplated for display to user 202 and for interacting with online self-serve tool 212. Each of the interfaces and associated modules for displaying the interfaces may include any type of executable software code such as a kernel component, an application program, a linked library, an object with methods, or other type of executable software code.

Figure 3:
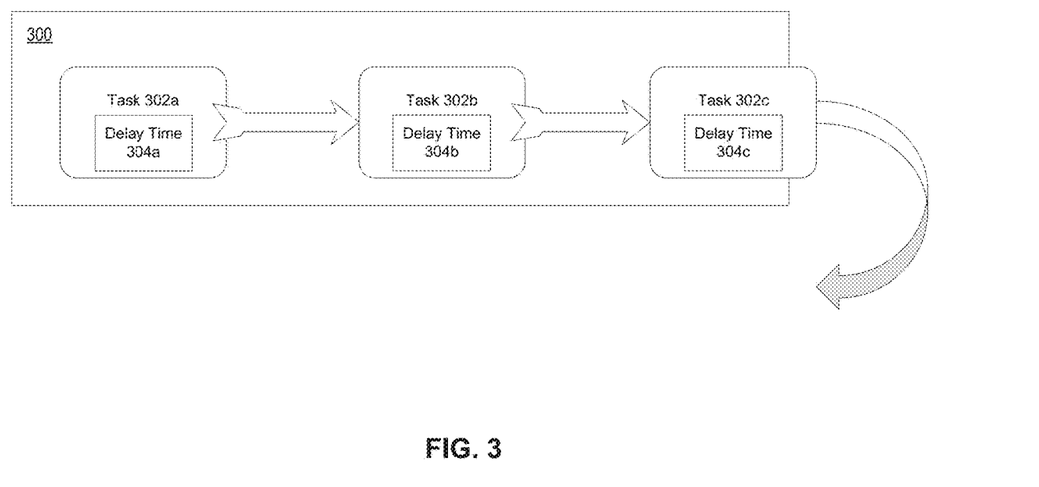
FIG. 3 is an illustration of a queue consistent with the disclosed embodiments.

Referring now to FIG. 3, there is shown an illustration of an exemplary queue 300. Queue 300 may be a data structure with multiple elements or "tasks" arranged in a linear data structure, such that when one task exits the queue, another task following it in the sequence of the linear data structure will be the next task to exit the queue. Queue 300 may exist as software and/or data on system 100. In some embodiments, queue 300 may comprise a distributed delay queue, operated by a cluster or a node within a cluster (e.g., a Redis cluster), as discussed further below. Queue 300 may have exemplary tasks 302*a*, 302*b*, and 302*c*, though queue 300 may have any number of tasks. Tasks 302*a*, 302*b*, and 302*c* may include data and instructions for an operation or operations to be performed on the data (e.g., to perform a calculation according to an algorithm using the data, perform statistical calculations based on the data, re-structure the data, send the data, send a result, etc.). In some embodiments, these tasks may include feedback data and/or algorithms by which the feedback data should be processed. Tasks 302*a*, 302*b*, and 302*c* may be related to a user, creative, dataset, content, or distribution channel (e.g., a medium or manner over which a creative is disseminated, such as via a webpage, e-mail, etc.). In some embodiments, tasks 302*a*, 302*b*, and 302*c* may be similar or related, such as by having similar parameters or sources, or may be completely unrelated.

In some embodiments, tasks 302*a*, 302*b*, and 302*c* may have associated delay times 304*a*, 304*b*, and 304*c*. A delay time may be an amount of time, represented by a data value in some embodiments, during which an associated task is kept in a queue (e.g., where it may be prevented from being processed). Delay time 304a may be calculated based on the task 302a it is associated with. For example, if task 302a relates to feedback data from a webpage creative, delay time 304a may be calculated based on an expected minimum time needed for the creative to collect sufficient feedback data. In some embodiments, delay time 304a may be based on a particular campaign (e.g., an advertising campaign associated with certain creatives) and/or user data associated with an individual to whom a creative is sent (e.g., to a user device associated with the individual). Such user data may include an individual's age, geographic location, address, transaction data, marital status, gender, interaction with previous creatives, etc. Delay times may be updated manually or automatically. For example, system 100 or a software layer of a cluster may determine that a delay time is too short, such as based on a determination that sufficient feedback data for processing has not been collected, and may increase a delay time. In other embodiments, a user may update a delay time using system 100, based on the performance of feedback processing. Updating delay times may be done not only for tasks whose delay times have elapsed, but also for tasks still awaiting processing that are similar or related to tasks whose delay times have been determined to be too short.

In some embodiments, when delay time 304c elapses, i.e., when task 302c is considered to have a baked time, task 302c may exit the queue. In some embodiments, when a task 302c exits the queue, it is sent (e.g. by a system 100) to a node (e.g., a node 4040a) for processing. In other embodiments, a node to which a task was sent or a software layer of a cluster may determine that task 302c contains insufficient data for processing (e.g., if a comparison of feedback data to a criterion cannot yield a result reaching a predetermined confidence level), and it may be sent to a system 100 or architecture 200, discarded, assigned a different delay time (e.g., a different delay time may be calculated based on a model associated with the task), and/or have its delay time reset.

In some embodiments, task 302c may represent the processing of feedback data received from a source external to queue 300. Feedback data may include information regarding a creative, such as how successful the creative was relative to one or more performance criteria, discussed below with respect to FIG. 5.

Figure 4:
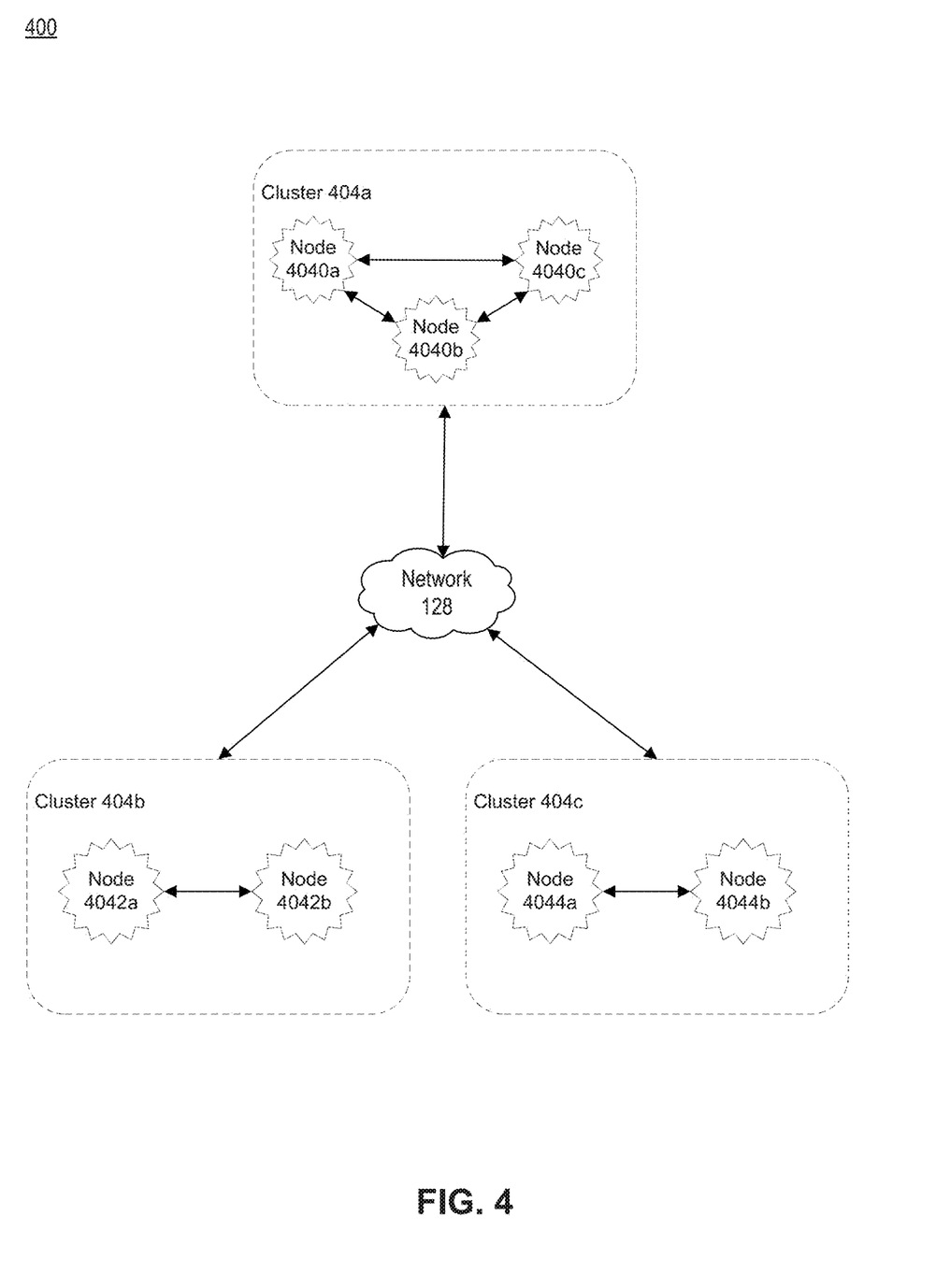
FIG. 4 is an illustration of an exemplary cluster architecture consistent with the disclosed embodiments.

Referring now to FIG. 4, there is shown an illustration of a cluster architecture 400. Cluster architecture 400 is shown to have clusters 404a, 404b, and 404c, but it may have any number of clusters. In some embodiments, clusters 404a, 404b, and 404c may reflect groups of one or more computers (systems 100, special purpose computers, servers, etc.) connected through network 128. In some embodiments, clusters 404a, 404b, and 404c may have one or more associated nodes. In some embodiments, a cluster (e.g., cluster 404a) may be a parent cluster, and other nodes to which it connects may be child clusters (e.g., clusters 404b and 404c).

In certain aspects, nodes 4040a, 4040b, and 4040c may be instances of system 100, server 208, or any other data processing device. In some embodiments, the collection of clusters and their associated nodes may reflect a distributed network for processing data and allocating load balances for purposes consistent with the disclosed embodiments. For example, as shown in FIG. 4, cluster 404a may have associated nodes 4040a, 4040b, and 4040c, cluster 404b may have associated nodes 4042a and 4042b, and cluster 404c may have associated nodes 4044a and 4044b. Moreover, in some embodiments, nodes 4040a, 4040b, and 4040c may be instances of ephemeral container instances, consistent with the disclosed embodiments. For example, a cluster may spin up any number of ephemeral container instances (which may be nodes) in order to process a task (e.g., a task from a queue). In some embodiments, a cluster may spin up an ephemeral container instance if it determines that the workload (e.g., processing activity) of the nodes within the cluster has reached a particular threshold. A cluster may have a software layer or an individual device (e.g. system 100) that manages its associated nodes (hereinafter referred to as an "orchestrator"). In some embodiments, nodes 4040a, 4040b, and 4040c may be virtual computing instances, such that cluster 404a is a single computer, server, or the like.

In some embodiments, cluster 404a may maintain, host, store, and/or manage one or more queues 300 in a manner consistent with the disclosed embodiments. For example, cluster 404a may manage a distributed delay queue, whose tasks cluster 404a may apportion out to its associated nodes. Cluster 404a may store a distributed delay queue in memory of the cluster itself (and/or in a node of the cluster), such as in RAM 110, allowing for faster processing of feedback data (La latency is decreased and strain on an external source may be reduced, as the duster does not need to access an external source to examine a queue and/or determine a delay time), Cluster 404a may also store a queue in a device such a hard disk drive 120 or memory device 126 of the cluster 404a. In other embodiments, nodes 4040a, 4040b, and 4040c may maintain their own individual queues, which may also be stored in memory of a node itself, such as in RAM 110. In other embodiments, queues, tasks, or related information may be stored remotely from cluster 404a, such as in database 140, if, for example, nodes 4040a, 4040b, and 4040c are instances of system 100.

In some embodiments, cluster 404a may send a task (e.g., task 302c), such as a task whose delay time has elapsed (i.e. its delay time is baked), to an available node. In some embodiments, an available node may represent a node that is not currently processing a task. In other embodiments, cluster 404a may send a task to a node whose resource usage, such as processor or bandwidth usage, is the lowest. A node's resource usage may be determined by that node itself (e.g., via an instance of system 100 tracking its own resource usage) or by an orchestrator of that node's associated cluster (e.g., by polling the node, tracking the latency and/or processes assigned to the node, via direct examination of the node's resource allocation, etc.). In some embodiments, a task may not exit a queue maintained by a cluster if all nodes of that cluster are currently processing.

In some embodiments, nodes 4040a, 4040b, and 4040c have associated listeners (not shown), which continually or periodically poll queue 300 for tasks exiting the queue (e.g., reflecting that the tasks are ready for processing). A listener may be contained within a node, or may be external to a node. Such an external listener may reside within the node's cluster or may reside outside the cluster. In some embodiments, when a listener detects a task (e.g., task 302c) whose delay time has elapsed, it may pull the task from the queue 300 and direct it to its associated node for processing. When a listener directs a task to its associated node, it may prevent another node from also receiving the task (e.g., by removing the task from the queue). In this way, nodes may work efficiently by reducing or eliminating the performance of duplicate operations. In some embodiments, a listener may not poll the queue 300 continually if the listener's associated node is currently processing information. In certain aspects, a listener may also periodically poll queue 300 for tasks exiting the queue. The periodicity of such polling may be determined for a given queue 300 based on, for example, a function of one or more delay times (e.g., delay times 304*a*, 304*b*) for one or more tasks (e.g., tasks 302*a*, 302*b*) associated with queue 300 and/or via the one or more delay times associated with one or more tasks that have exited queue 300. In some embodiments, for instance, queue 300 may be periodically polled based on a sum of all delay times, an average delay time, a median delay time, a weighted average delay time wherein each delay time is associated with a respective weight signifying the relevant importance of a task, one or more tasks associated with the queue, an assigned period associated with a given node and/or cluster, etc., including any combinations thereof.

Figure 5:
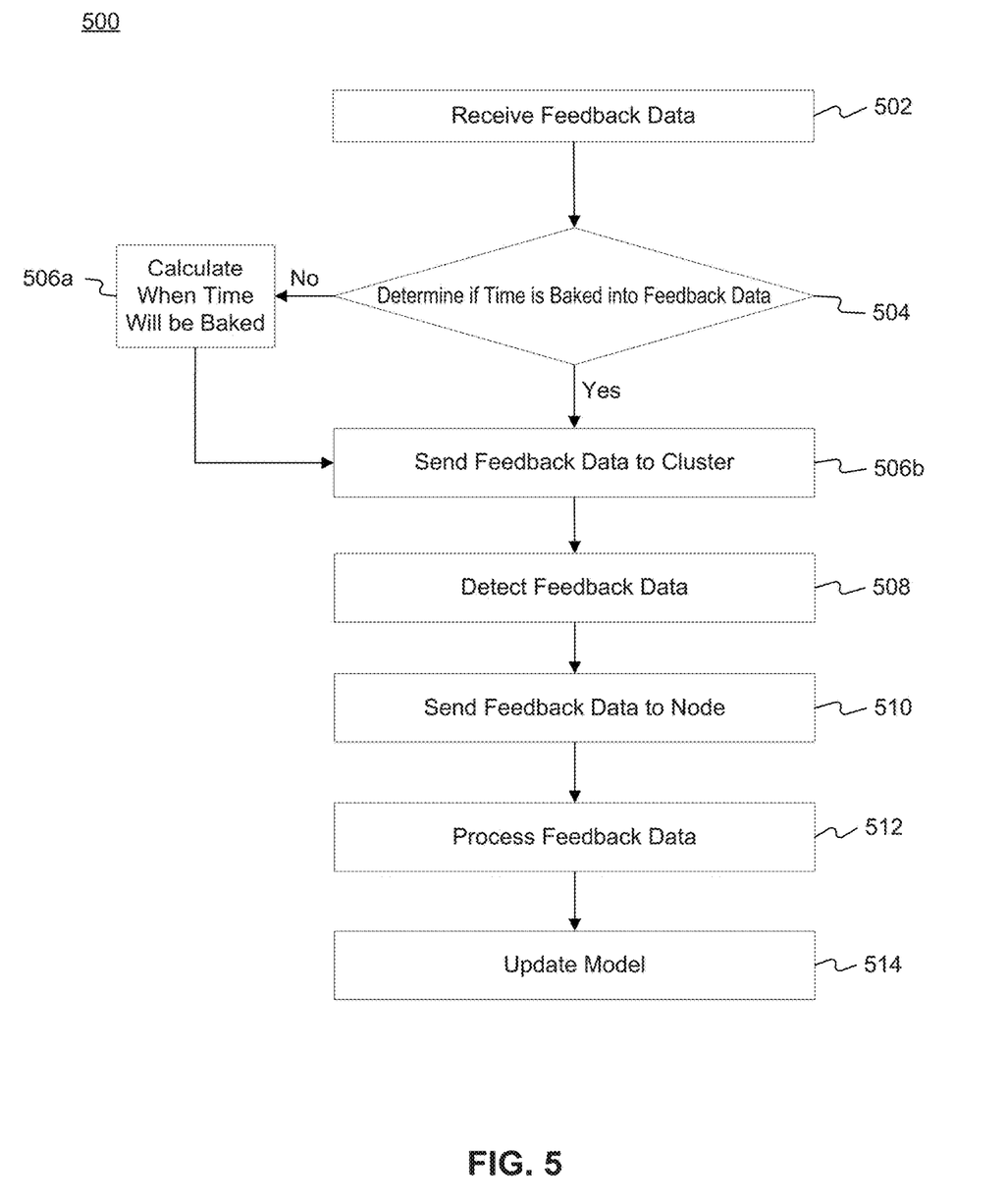
FIG. 5 depicts an exemplary process flowchart for feedback data management consistent with the disclosed embodiments.

Referring now to FIG. 5, there is shown a flow chart of an exemplary feedback data management process 500, consistent with the disclosed embodiments. In some embodiments, exemplary feedback data management process 500 may be executed by cluster architecture 400 (e.g. implemented on at least one computing system such as system 100), to manage feedback data and associated models.

At step 502, feedback data is received at a computing device associated with architecture 400. In some embodiments, cluster architecture 400 may include any number of servers 208 and/or systems 100, upon which nodes and/or clusters may be disposed (as described above). In some embodiments, the feedback data is associated with a particular creative or a particular distribution channel to which a creative was sent, such as an email distribution or a webpage. Feedback data may also be associated with a particular demographic (age, sex, gender, location, a particular interest, income level, education level, marital status, type of computing device used, etc.) associated with user devices on which a creative was displayed (e.g., mobile device 136). Feedback data may be generated directly at a user device that views a creative or by server 208 or another computing device (e.g., system 100) based on data received from a user device. Once generated, feedback data may be sent from a user device, server 208, or other computing device to the receiving device.

Feedback data may include information regarding a creative, such as a total number of clicks on the creative per amount of time (e.g., for all time, over one or more time periods, etc.), a number of clicks on the creative per user per amount of time, a number of views of the creative per amount of time, a number of views of the creative per user per amount of time, a number of "hits" of the creative during an amount of time (such as if the creative is a webpage), a response rate (i.e. the number of users interacting in some way, such as by making a purchase of an advertised product, with the creative out of the total number of users who viewed the creative or to whom the creative was sent), a number of views or clicks (total or on a per-user basis) on the creative for one or more give device types (e.g., mobile devices, laptops, desktops, etc.), a number of view or clicks (total or on a per-user basis) on the creative for one or more distribution channels (e.g., e-mail, webpage, etc.), an amount of scrolling (e.g., performed on a webpage by a user), an amount of time a creative was visible on a display (total or on a per-user basis), or any other indicator of a degree of user interaction with the creative.

At step 504, a determination is made at the receiving device as to whether the feedback data has a baked time, i.e., if its associated delay time has elapsed. In some embodiments, the delay time for the feedback may be revised, modified, or nullified in ways consistent with the disclosed embodiments (e.g., as described in connection with FIG. 3). If the feedback data does not have time baked into it, the process proceeds to step 506*a*. If the feedback data has time baked into it, the process proceeds to step 506*b*. At step 506*a*, the process may automatically calculate when the time will be baked (e.g., based on a particular campaign) and proceeds to step 506*b* at that time. At step 506*b*, the feedback data is sent to a cluster, where it may be processed by a node of that cluster.

At step 508, the feedback data is detected, such as by a listener associated with an available node of the cluster to which the feedback data was sent (as discussed with respect to FIG. 4).

At step 510, the feedback data is sent to a node (e.g., node 4040*a*), which may be a node of the cluster (e.g., cluster 404*a*) to which the feedback data was initially sent. In some embodiments, the feedback data may be sent to the node based on whether it was detected by the node's listener (as discussed with respect to FIG. 4) before any other node's listener. In other embodiments, the feedback data may be sent to the node based on a determination made by an orchestrator associated with the cluster to which the feedback data was initially sent. This may occur when a listener associated with a particular node, such as an available node, has detected the feedback data, and directs the feedback data to be sent to its node.

At step 512, the feedback data is processed, such as by comparing the feedback data to one or more performance criteria, which may be a goal or expectation for a certain degree of user interaction with a creative (e.g., a response rate of 10%). This may be done by the node that received the feedback data at step 510. In some embodiments, performance criteria may include information such as a predetermined total number of clicks on the creative per amount of time (e.g., for all time, over one or more time periods, etc.), a predetermined number of clicks on the creative per user per amount of time, a number of views of the creative per amount of time, a predetermined number of views of the creative per user per amount of time, a predetermined number of "hits" of the creative during an amount of time (such as if the creative is a webpage), a predetermined response rate (e.g., the number of users interacting in some way, such as by making a purchase of an advertised product, with the creative out of the total number of users who viewed the creative or to whom the creative was sent), a predetermined number of views or clicks (total or on a per-user basis) on the creative for one or more give device types (e.g., mobile devices, laptops, desktops, etc.), a predetermined number of view or clicks (total or on a per-user basis) on the creative for one or more distribution channels (e.g., e-mail, webpage, etc.), a predetermined amount of scrolling (e.g., performed on a webpage by a user), a predetermined amount of time a creative was visible on a display (total or on a per-user basis), or any other indicator of a degree of user interaction with the creative.

Based on how well the feedback data indicates the creative performed relative to the performance criteria, the creative may be classified as successful or unsuccessful. For example, if a performance criterion requires 20% of users who view a particular creative click a link of the creative, feedback data indicating that 15% of users who viewed the particular creative clicked the link may be classified as unsuccessful, and feedback data indicating a 25% click rate may be classified as successful. In other embodiments, a degree of success is associated with a creative (e.g., the 15% and 25% click rates of the foregoing example). As another optional part of the processing, the feedback data may be aggregated with similar or related feedback data to increase the robustness of the data set. For example, feedback data associated with an email creative may be considered similar or related to other feedback data when the feedback data pertain to the same product, pertain to products in of the same class, are associated with a webpage creative for the same product, pertain to a different product that is associated with the same creator of the particular product. In some embodiments, feedback data associated with a creative targeted at a particular demographic (which may be a subset of different demographic groups) may be considered similar or related to other feedback data associated with another creative targeted at the same or similar demographic. Any system consistent with the disclosed embodiments may determine whether feedback data may be aggregated in this way (e.g., system 100). In some aspects, the feedback data may also be compared to older feedback data (e.g., previously processed feedback data) to determine trends across different creatives.

At step 514, a model is updated. In some aspects, this model may reflect an algorithm that represents a creative with which it is associated. In some embodiments, this algorithm may have a number of parameters which, when modified, make corresponding modifications to part of the creative. These parameters may include, for example, parameters that control color scheme, font, image, link path, or other information associated with or displayed by a creative. Other parameters may be associated with an element of user data, described with respect to FIG. 3 (e.g., a model parameter related to a user's geographic location may be updated such that creatives, such as an email, are sent to individuals in that geographic location more often). In some embodiments, for example, if a model is in a learning phase, suggested parameter changes may be sent to a user device (e.g., system 100 associated with a user 202) for approval prior to the model being updated. For example, system 100 may display GUI elements describing proposed changes to a model that were determined by server 208 based on processing performed at step 512. A user may interact with (e.g., click on) at least one GUI element to approve or disapprove of any number of suggested changes to the model. Following this user interaction, the model may be updated such that the approved changes are implemented (i.e., parameters with approved changes are updated). In other embodiments, a model may be automatically updated (e.g., based on the processing performed at step 512 and/or a machine-learning algorithm).

In some embodiments, the model may be stored at a database 140, which may be accessible to multiple nodes and/or clusters. In this manner, the model may be updated according to processing performed (e.g. exemplary feedback data management process 500) at multiple nodes, so that multiple inconsistent versions of the same model are not maintained.

In some embodiments, a new creative associated with the updated model may be sent to a user for approval to distribute to a website, user device, or the like. For example, the new creative may be sent to a system 100 and displayed to a user 202 at display 130. Interfaces, such as approval interfaces 224, may be displayed to the user, which enable a user 202 to select (e.g., by selecting a graphic element on a GUI of display 130) whether to approve the creative for distribution or decline the creative for distribution. If the user indicates approval of the creative at any of approval interfaces 224, system 100 may send the creative to another device (another system 100, server 208, or the like), which may distribute the creative to a distribution channel with which the creative is associated (a webpage, email messages to a particular demographic, etc.).

In other embodiments, a new creative associated with the updated model may be distributed without approval. In this manner, creatives may be automatically and dynamically updated to respond to user interactions. For example, if a particular color scheme is determined (e.g. by a node at step 512) to elicit more clicks on a webpage graphic from users, currently existing and/or future instances of that webpage graphic may be reconfigured to include the particular color scheme.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for configuring a computerized model for improving creatives, comprising:
   one or more memory units storing instructions;
   one or more processors that execute the instructions;
   a bus that interconnects the one or more memory units and the one or more processors; and a server configured to operate a multi-armed bandit application programming interface (API) that is accessible by the one or more processors and that is configured to analyze a creative, the server also communicates with an on-line self-serve tool configured to be accessed by a user through a portal;
   the one or more processors configured to interact with the mufti-armed bandit API and configured to execute the instructions to perform operations comprising:

sending, to a device, the creative configured for display on the device;
receiving, from the device, feedback data associated with the creative, the feedback data indicating a degree of user interaction with the creative;
checking the feedback data for a baked time associated with the creative; sending the feedback data to a node based on the baked time; and
dynamically updating, by the node, the multi-armed bandit API associated with the feedback data, wherein receiving the feedback data is based on a delay time associated with the feedback data, wherein the feedback data acquires the baked time when an age of the feedback data is equal to or greater than the associated delay time, wherein the node is part of a cluster, the cluster having a plurality of nodes,
wherein the node includes a listener, and when the listener detects the feedback data based on the delay time, the listener is configured to direct the feedback data to the node for processing while preventing another node from receiving the feedback data such that the plurality of nodes are enabled to work efficiently by reducing or eliminating number of operations, and by decreasing latency and reducing strain on system resources including storage devices and a network interface, and
wherein the creative includes at least one of an email, webpage advertisement, or a webpage, for a vehicle finance marketing campaign.

2. The system of claim 1, the operations further comprising: determining a difference between the feedback data and expected feedback data, wherein the updating is based on the determined differences.

3. The system of claim 1, the operations further comprising: determining the feedback data, does not have a baked time; and waiting a predetermined amount of time before deter reining the feedback data has a baked time, wherein the feedback data is sent to the node after determining the feedback data has a baked time.

4. The system of claim 1, wherein the node is a first node, the operations further comprising: sending the feedback data to a second node of the cluster before sending the feedback data to the first node; and determining the feedback data cannot be processed by the second node.

5. The system of claim 4, wherein the plurality of nodes comprises listeners that detect when a node is available and direct the feedback data to the available node.

6. The system of claim 5, the operations further comprising detecting, at the cluster, the feedback data, and wherein the feedback data is sent from a distributed delay queue associated with the cluster.

7. The system of claim 1, wherein the associated delay time is (i) calculated based on a distribution channel associated with the feedback data and (ii) stored in a memory component of the cluster.

8. The system of claim 1, wherein the device is a user device, the operations further comprising storing the feedback data at a memory component of the cluster.

9. The system of claim 1, wherein the feedback data is associated with a distribution channel and the creative is associated with the distribution channel.

10. The system of claim 9, wherein the model comprises parameters associated with the distribution channel and the feedback data.

11. The system of claim 10, wherein the feedback data indicates a time associated with a user interaction with the creative.

12. The system of claim 10, wherein the model is a first model, the distribution channel is a first distribution channel, the creative is a first creative; and the operations further comprise: determining a second model associated with (i) a second creative associated with the first creative or (ii) a second distribution channel associated with the first creative, and updating the second model based on the received feedback data.

13. The system of claim 1, wherein the operations further comprise updating the creative using the updated model.

14. A method for configuring a computerized model for improving creatives, comprising one or more processors configured to interact with a multi-armed bandit application programming interface (API) and perform the following operations:
receiving feedback data associated with a creative from a device, the feedback data indicating a degree of user interaction with the creative;
placing the feedback data into a distributed delay queue;
determining the feedback data has a baked time associated with the creative;
sending the feedback data to a cluster based on the baked time, the cluster having a plurality of nodes;
determining an available node of the plurality of nodes;
sending the feedback data to the available node; and
dynamically updating, by the node, the multi-armed bandit API associated with the feedback data, wherein receiving the feedback data is based on a delay time associated with the feedback data, wherein the feedback data acquires the baked time when an age of the feedback data is equal to or greater than the associated delay time, wherein the node is part of a cluster, the cluster having a plurality of nodes,
wherein the node includes a listener, and when the listener detects the feedback data based on the delay time, the listener is configured to direct the feedback data to the node for processing while preventing another node from receiving the feedback data such that the plurality of nodes are enabled to work efficiently by reducing or eliminating number of operations, and by decreasing latency and reducing strain on system resources including storage devices and network interface, and
wherein the creative includes at least one of an email, webpage advertisement, or a webpage.

15. A non-transitory computer-readable medium storing instructions that when executed by a processor, that is configured to interact with a multi-armed bandit application programming interface (API), cause the processor to operate a computer system for configuring a computerized model for improving creatives by performing operations, the operations comprising:
receiving feedback data from a device, the feedback data having an associated distribution channel and an associated creative, wherein the feedback data comprises an indication of a degree of user interaction with the creative on the distribution channel;
checking the feedback data for a baked time associated with the creative sending the feedback data to a node based on the baked time;
dynamically updating, by the node, the multi-armed bandit API of the associated creative, wherein receiving the feedback data is based on a delay time associated with the feedback data, wherein the feedback data acquires the baked time when an age of the feedback data is equal to or greater than the associated delay time, wherein the node is part of a cluster, the cluster having a plurality of nodes, wherein the node includes a listener, and when the listener detects the feedback data based on the delay time, the listener is configured to direct the feedback data to the node for processing while preventing another node from receiving the feedback data such that the plurality of nodes are enabled to work efficiently by reducing or eliminating a number of operations, and by decreasing latency and reducing strain on system resources including storage devices and a network interface, and wherein the creative includes at least one of an email, webpage advertisement, or a webpage.

\* \* \* \* \*